United States Patent Office 2,812,280
Patented Nov. 5, 1957

2,812,280

PREPARATION OF BIS (HALOPHENYL) TRICHLOROETHANOL

Harold F. Wilson, Moorestown, N. J., and Elwood Y. Shropshire and W E Craig, Philadelphia, Pa., assignors to Rohm & Haas Company, Philadelphia, Pa., a corporation of Delaware No Drawing. Application April 20, 1954, Serial No. 424,496

11 Claims. (Cl. 167—30)

This invention concerns 1,1-bis(halophenyl)-2,2,2-trichloroethanols, pesticidal compositions containing a said compound as an active agent, and a method of controlling mites on plants with one or more of these substances. This invention also deals with a method for preparing these ethanols.

The compounds of this invention have the structure

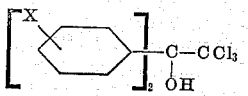

where X is a halogen of an atomic weight not over 80. They are prepared by reacting a 1,1-bis(halophenyl)-1,2,2,2-tetrachloroethane with aqueous formic acid at temperatures between 100° and 125° C. or with aqueous acetic acid in the presence of sulfuric acid, or a sulfonic acid, likewise at elevated temperatures.

The starting materials, 1,1-bis(halophenyl)-1,2,2,2-tetrachloroethanes, are known compounds. In previously reported attempts to react these tetrachloroethanes various products have been found but not the bis(halophenyl)trichloroethanols of this invention. For example, in the presence of ferric chloride 1,1-bis(chlorophenyl)-1,2,2,2-tetrachloroethane was found to yield

and in the presence of strong sulfuric acid and water to yield 4,4'-dichlorobenzil, ClC6H4COCOC6H4Cl. Although hydrolysis of chlorides can usually be accomplished with the aid of alkali, heating of 1,1-bis(halophenyl)-1,2,2,2-tetrachloroethane with sodium hydroxide in ethanol fails to cause the hydrolysis.

We have found that when a 1,1-bis(halophenyl)-1,2,2,2-tetrachloroethane is heated with at least the theoretical amount of water in the presence of an excess of formic acid or of an excess of acetic acid along with a small amount of sulfuric acid or a sulfonic acid, such as p-toluenesulfonic acid, benzenesulfonic acid or an alkanesulfonic acid, typical of which are the methanesulfonic acid mixtures of commerce and butanesulfonic acid, the 1-chlorine atom is displaced with an OH group. The resulting trichloroethanol is peculiarly effective as a pesticide, particularly as a miticide on living plants.

In effecting the hydrolysis with aqueous formic or acetic acid, we have found temperatures above 100° C. useful. The reaction is accomplished by heating the reaction mixture under reflux at normal atmospheric pressure or at higher temperatures under pressure. The reaction mixture should contain an amount of water at least equivalent to the bis(halophenyl)-tetrachloroethane. When the water is taken up in formic or acetic acid, the acid will comprise about 80% to 95% of the solution. It is convenient to use a two-to-ten-fold excess of such an acid solution. The mixture is heated for a time sufficient to cause at least a substantial conversion to the bis(halophenyl)trichloroethanol. Under reflux at normal pressures this may require 24 or more hours. This time is shortened by even a small increase in temperature, as from increased pressure.

When formic acid is used, there is little gained by the addition of a strong inorganic acid as catalyst. On the other hand, addition of 5% to 10% of sulfuric acid or a sulfonic acid to acetic acid shows an appreciable effect on rate of hydrolysis.

The hydrolysis reaction may be applied to 1,1-bis(fluorophenyl)-1,2,2,2-tetrachloroethane, 1,1-bis(chlorophenyl)-1,2,2,2-tetrachloroethane, or 1,1-bis(bromophenyl)-1,2,2,2-tetrachloroethane in their various isomeric forms. The chief form is that in which the halogen is in the para position, but other isomers may be used as well as mixtures of isomers, comparable to those encountered in commercial preparations of 1,1-bis(chlorophenyl)-2,2,2-trichloroethane.

As is known, the bis(halophenyl)tetrachloroethanes are prepared from 1,1-bis(halophenyl)-2,2,2-trichloroethanes. These may be chlorinated directly, preferably in the presence of a free radical catalyst or of light. An organic peroxide, such as benzoyl peroxide, or an azo catalyst, such as azodiisobutyronitrile or dimethyl azodiisobutyrate, may be used to speed up chlorination considerably.

In another method a 1,1-bis(halophenyl)-2,2-dichloroethylene is formed, as by dehydrohalogenation of a corresponding bis(halophenyl)trichloroethane with alkali and the dichloroethylene compound is chlorinated.

Additional details of preparing compounds of this invention are presented in the following illustrative examples, wherein parts are by weight.

Example 1

There were mixed 39 parts of 1,1-bis(p-chlorophenyl)-1,2,2,2-tetrachloroethane, 210 parts of glacial acetic acid, 9 parts of water, and 11 parts of 96% sulfuric acid. The mixture was stirred and heated at reflux temperatures for 30 hours. The reaction mixture was cooled and heated with 250 parts of water and 200 parts of benzene. Layers formed and were separated. The organic layer was washed with dilute sodium carbonate solution and with water. Solvent was removed by distillation under reduced pressure to leave 27 parts of residue which was chiefly 1,1-bis(p-chlorophenyl)-2,2,2-trichloroethanol with some unhydrolyzed starting material.

The above procedure was followed but with substitution of p-toluenesulfonic acid for the sulfuric acid. Reaction was continued, however, for only 24 hours, at which time about 40% of the starting material had been converted to 1,1-bis(chlorophenyl)2,2,2-trichloroethanol.

Example 2

(a) A solution was prepared from 71 parts of 1,1-bis-chlorophenyl)-2,2,2-trichloroethane having a melting point of 100°–103° C. and 0.5 part of azodiisobutyronitrile in 320 parts of sym-tetrachloroethane. The solution was heated to 85° C. and chlorine gas was passed in. An exothermic reaction set in and the temperature of the reaction mixture rose to 102° C. After about an hour the theoretical amount of chlorine had been taken up. Solvent was stripped from the reaction mixture to give a viscous oil which crystallized when triturated with petroleum ether. The yield was 55 parts of 1,1-bis(chlorophenyl)-1,2,2,2-tetrachloroethane. This product melted at 90°–92° C.

(b) A mixture of 39 parts of the above 1,1-bis(chlorophenyl)-1,2,2,2-tetrachloroethane, 100 parts of dimethylformamide, and 240 parts of 90% formic acid was stirred and heated under reflux for 24 hours. The oily product was taken up in 250 parts of benzene. The acid layer was removed. The benzene layer was washed with dilute sodium carbonate solution and with water. Solvent was distilled from the washed solution under reduced pressure to yield 70 parts of product which by analysis for hydrolyzable chlorine was 94% pure 1,1-bis(chlorophenyl)-2,2,2-trichloroethanol.

The above example illustrates among other things the use of a solvent during the hydrolysis of the dichlorophenyl-tetrachloroethane. Other inert organic solvents may be used in place of dimethylformamide.

*Example 3*

(a) To a slurry of 454 parts of technical 1,1-bis(chlorophenyl)-2,2,2-trichloroethane (DDT) in 400 parts of methanol there was slowly added flake caustic soda to a total of 80 parts. The mixture was stirred and heated under reflux for two hours. Methanol was distilled off and 625 parts of ethylene chloride added. The solution was washed with water to remove inorganic salts and dried by azeotropic distillation. Addition was made of four parts of azodiisobutyronitrile. The solution was then heated to 78° C. and chlorine was passed in. The temperature of the reaction mixture rose to 92° C. After two hours flow of chlorine was discontinued. Solvent was removed under reduced pressure to leave 445 parts of a product which partially solidified when cooled. This was technical 1,1-bis(chlorophenyl)-1,2,2,2-tetrachloroethane, containing by analysis 54% of chlorine.

(b) There were mixed 519 parts of technical 1,1-bis(chlorophenyl)-1,2,2,2-tetrachloroethane and 2,640 parts of 90% formic acid. The mixture was stirred and heated under reflux for 24 hours, the temperature being 103°–109° C. The reaction mixture was cooled to 70° C. and treated with 700 parts of octane and 1000 parts of water. Layers formed and were separated. The solvent layer was washed with aqueous 5% sodium carbonate solution and with water. The octane was distilled off under reduced pressure to leave a residue which by analysis contained 81% of 1,1-bis(chlorophenyl)-2,2,2-trichloroethanol.

1,1-bis(fluorophenyl)-2,2,2-trichloroethane is reacted with caustic soda as above to give the dichloroethylene, which is in turn chlorinated to the tetrachloroethane compound. This is reacted as above with 90% formic acid and hydrolyzed product is separated in the same way. It is essentially 1,1-bis(fluorophenyl)-2,2,2-trichloroethanol.

By the same procedure there is prepared from 1,1-bis(bromophenyl)-2,2,2-trichloroethane 1,1-bis(bromophenyl)-2,2,2-trichloroethanol. We have found that the presence of the halophenyl groups is necessary for the successful operation of our process.

*Example 4*

Pure 1,1-bis(4-chlorophenyl)-1,2,2,2-tetrachloroethane was prepared by above methods. A mixture of 117 parts of this and 720 parts of 90% formic acid was stirred and heated under reflux for 42 hours. The cooled reaction mixture was diluted with water and treated with 250 parts of octane. Layers formed and were separated. The organic layer was washed with aqueous sodium carbonate solution and then with water. The solvent was distilled off under reduced pressure. The 102 parts of residue was dissolved in about 80 parts of methanol. This solution was cooled. A small amount of a yellow solid separated out and was removed by filtering. This solid, amounting to 1.5 parts, melted at 193.5°–194.5° C., and was found by analysis to be 4,4'-dichlorobenzil. The methanol filtrate was concentrated and the residue was distilled. At 177°–179° C./0.35 mm. a fraction of 99.3% pure 1,1-bis(4-chlorophenyl)-2,2,2-trichloroethanol, as shown by analysis, was obtained. This compound is a very viscous, light yellow liquid. It is thermally stable. It does not react with pyridine. It does not yield color in sulfuric acid.

The 1,1-bis(halophenyl)-2,2,2-trichloroethanols of this invention may be formulated with diluents, carriers, solvents, wetting agents, dispersing agents, fungicides, or insecticides. These compounds may be used as active ingredients in dusts, wettable powders, or salt-emulsifying concentrates.

As solid carriers and diluents there may be used clays, pyrophillite, diatomaceous earth, talc, magnesium carbonate, calcium carbonate, calcium silicate, or other finely divided solids. Dispersing, wetting, and/or sticking agents may be added. A typical formulation of a wettable powder is as follows: 25 parts of 1,1-bis(fluorophenyl)-2,2,2-trichloroethanol, 72 parts of finely-divided, precipitated, hydrated calcium silicate, 2 parts of the sodium salt of condensed formaldehyde-naphthalenesulfonate, 0.5 part of an octylphenoxypolyethoxyethanol, and 0.5 part of magnesium carbonate. Other bis(halophenyl)trichloroethanols can be used in the same way.

A practical emulsifiable concentrate is made of 71 parts of methylated naphthalenes, 26 parts of 1,1-bis(chlorophenyl)-2,2,2-trichloroethanol, one part of methylene bis(diamylphenoxypolyethoxyethanol), 0.8 part of a polyglycerol-oleic acid condensate, 0.2 part of an alkylbenzenesulfonate, and one part of a mixture of antioxidant and anti-foam agents.

A dust was prepared from 5 parts of 1,1-bis(chlorophenyl)-2,2,2-trichloroethanol, 2 parts of sodium formaldehyde-naphthalenesulfonate, one part of a condensate of polyglycerol-oleic acid-phthalic anhydride, and 92 parts of clay and diatomaceous earth. This dust was applied against the army worm on bean plants. After three days, a kill of 37% and after six days, a kill of 87% was obtained. In contrast the compound 1,1-bis(chlorophenyl)-2,2-dichloroethanol gave a kill of only three percent. This test along with others establishes that the compounds of this invention are surprisingly active against some insects as well as against mites.

A great variety of wetting agents may be used. For emulsion concentrates it is generally desirable to select a solvent soluble agent which serves as emulsifier, dispersant, and wetting agent, such as an alkylphenoxypolyethoxyethanol, alkoxypolyethoxyethanol, alkylthiopolyethoxyethanol, or an ethylene oxide condensate with a long chain fatty acid or abietic acid. Typical ethylene oxide derivatives are made with such alkylphenols as octylphenol, nonylphenyl, dodecylphenol, alkylphenols condensed with formaldehyde, tert-dodecylmercaptan, tert-tetradecylmercaptan, dodecyl alcohol, tall oil acids, oleic acid, etc. Alkylbenzene sulfonates, dodecylsulfate, alkylphenoxypolyethoxyethylsulfonates, and the like may also be used. Useful dispersants are not only the mentioned formaldehyde-naphthalenesulfonates, but also the lignin sulfonate dispersants. Other solvents include xylene, pine oil, chlorinated hydrocarbons, and selected naphthas.

A wettable powder containing 1,1-bis(4-chlorophenyl)-2,2,2-trichloroethanol was diluted with water at 1:400 and applied in a spray. The kill of army worms after three days was 63% and after six days was 100%. Similar tests at dilutions of 1:800 and 1:1600 gave kills of 93% after six days.

An aqueous spray made with an emulsifiable concentrate of 1,1-bis(4-chlorophenyl)-2,2,2-trichloroethanol was tested against the army worm. At dilutions of 1:400, 1:800, 1:1600, and 1:3200, kills of 100% were obtained after six days.

A spray prepared with an emulsifiable concentrate of 1,1-bis(chlorophenyl)-2,2,2-trichloroethanol at a dilution of 1:25,600 was applied to foliage infested with the two-spotted mite. A kill of 100% was obtained. The tests were repeated at a dilution of 1:51,200 with a kill of 100%. At 1:200,000 the kill was 83%.

Tests for the ovicidal action of the above compound and its fluoro and bromo analogues are also favorable. At a dilution of 1:1600 kills of eggs of the two-spotted mite are 80% to 97%.

Tests with various bis(halophenyl)trichloroethanols having several isomers present give likewise high kills of the above pests and of mite eggs.

We claim:
1. As new chemical substances, compounds of the structure

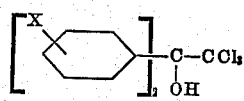

where X is a halogen of atomic weight not over 80.
2. As a new chemical compound, 1,1-bis(chlorophenyl)-2,2,2-trichloroethanol.
3. As a new chemical compound, 1,1-bis(fluorophenyl)-2,2,2-trichloroethanol.
4. As a new chemical compound, 1,1-bis(bromophenyl)-2,2,2-trichloroethanol.
5. A process for preparing compounds of the structure

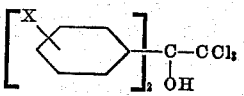

where X is a halogen of atomic weight not over 80, which comprises heating a compound of the formula

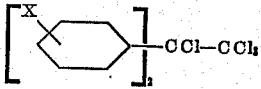

in aqueous 70% to 95% formic acid between about 100° and 125° C.
6. A process for preparing compounds of the structure

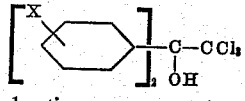

which comprises heating a compound of the formula

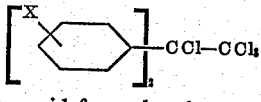

with water in an acid from the class consisting of 70% to 95% formic acid and 70% to 95% acetic acid containing sulfuric acid, X being a halogen of atomic weight not over 80.

7. A pesticidal composition comprising a compound of the formula

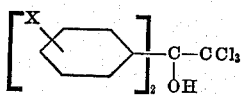

where X is a halogen of atomic weight not over 80, dispersed in a carrier.
8. A pesticidal composition comprising 1,1-bis(chlorophenyl)-2,2,2-trichloroethanol dispersed in a finely divided solid carrier together with a dispersing agent.
9. A pesticidal composition comprising 1,1-bis(chlorophenyl)-2,2,2-trichloroethanol dissolved in an inert organic solvent together with a solvent-soluble wetting agent.
10. A method of controlling mites on plants which comprises applying to said plants a compound of the formula

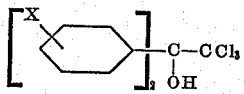

wherein X is a halogen of atomic weight not over 80.
11. A method of controlling mites on plants which comprises applying to said plants 1,1-bis(chlorophenyl)-2,2,2-trichloroethanol.

References Cited in the file of this patent
UNITED STATES PATENTS

| | | |
|---|---|---|
| 2,315,557 | Soday | Apr. 6, 1943 |
| 2,654,688 | Basel | Oct. 6, 1953 |
| 2,686,816 | Stoll et al. | Aug. 17, 1954 |
| 2,720,548 | Craig et al. | Oct. 11, 1955 |

OTHER REFERENCES

Journal Economic Entomology, vol. 41, December 1948, p. 875.
Pepper et al.: Journal American Chemical Soc., vol. 72 (1950), p. 1417.